US010214671B2

(12) United States Patent
Shimomura et al.

(10) Patent No.: US 10,214,671 B2
(45) Date of Patent: Feb. 26, 2019

(54) REFRIGERATOR OIL AND WORKING FLUID COMPOSITION FOR REFRIGERATOR

(71) Applicant: JX Nippon Oil & Energy Corporation, Tokyo (JP)

(72) Inventors: Yuji Shimomura, Yokohama (JP); Katsuya Takigawa, Yokohama (JP)

(73) Assignee: JX NIPPON OIL & ENERGY CORPORATION, Chiyodaku-Tokyo (JP)

( * ) Notice: Subject to any disclaimer, the term of this patent is extended or adjusted under 35 U.S.C. 154(b) by 0 days.

(21) Appl. No.: 15/073,836

(22) Filed: Mar. 18, 2016

(65) Prior Publication Data

US 2016/0208154 A1 Jul. 21, 2016

Related U.S. Application Data

(63) Continuation of application No. 12/528,502, filed as application No. PCT/JP2008/053182 on Feb. 25, 2008, now Pat. No. 9,321,948.

(30) Foreign Application Priority Data

Feb. 27, 2007 (JP) ................... 2007-047592
Aug. 28, 2007 (JP) ................... 2007-221519
Oct. 29, 2007 (JP) ................... 2007-280594

(51) Int. Cl.
*C09K 5/04* (2006.01)
*C10M 105/38* (2006.01)
*C10M 171/00* (2006.01)
*C10M 105/40* (2006.01)

(52) U.S. Cl.
CPC .............. *C09K 5/045* (2013.01); *C09K 5/044* (2013.01); *C10M 105/38* (2013.01); *C10M 105/40* (2013.01); *C10M 171/008* (2013.01); *C09K 2205/104* (2013.01); *C09K 2205/122* (2013.01); *C09K 2205/126* (2013.01); *C10M 2207/2835* (2013.01); *C10N 2220/022* (2013.01); *C10N 2220/30* (2013.01); *C10N 2220/302* (2013.01); *C10N 2220/303* (2013.01); *C10N 2220/306* (2013.01); *C10N 2230/08* (2013.01); *C10N 2230/10* (2013.01); *C10N 2230/12* (2013.01); *C10N 2230/66* (2013.01); *C10N 2240/30* (2013.01)

(58) Field of Classification Search
CPC .. C09K 5/045; C09K 5/044; C09K 2205/126; C09K 2205/122; C10M 105/38; C10M 171/008

See application file for complete search history.

(56) References Cited

U.S. PATENT DOCUMENTS

| 5,185,092 | A | 2/1993 | Fukuda et al. |
| 5,449,472 | A | 9/1995 | Egawa |
| 5,470,497 | A | 11/1995 | Schlosberg et al. |
| 5,654,383 | A | 8/1997 | Kohler |
| 5,711,165 | A | 1/1998 | Iizuka |
| 5,798,054 | A * | 8/1998 | Sato ........................ C09K 5/045 252/68 |
| 5,804,096 | A * | 9/1998 | Sato ........................ C09K 5/041 252/68 |
| 5,964,581 | A | 10/1999 | Iizuka |
| 6,029,459 | A | 2/2000 | Iizuka |
| 6,153,118 | A | 11/2000 | Hasegawa |
| 6,190,574 | B1 * | 2/2001 | Nakagawa ............ C10M 105/74 252/68 |
| 6,221,274 | B1 | 4/2001 | Akahori et al. |
| 6,228,282 | B1 | 5/2001 | Shimomura et al. |
| 6,258,293 | B1 | 7/2001 | Iizuka |
| 6,350,392 | B1 | 2/2002 | Schnur |
| 6,458,288 | B1 | 10/2002 | Kawaguchi |
| 6,551,523 | B1 | 4/2003 | Schnur |
| 6,582,621 | B1 | 6/2003 | Sasaki |
| 6,667,285 | B1 | 12/2003 | Kawahara et al. |
| 6,692,654 | B2 | 2/2004 | Osumi et al. |
| 6,759,373 | B2 | 7/2004 | Tazaki |
| 6,858,571 | B2 | 2/2005 | Pham et al. |
| 6,969,701 | B2 | 11/2005 | Singh et al. |

(Continued)

FOREIGN PATENT DOCUMENTS

| AU | 2008220295 | 9/2008 |
| CN | 1157848 A | 8/1997 |

(Continued)

OTHER PUBLICATIONS

Office Action in Japanese counterpart application, P2016-047213, dated Dec. 13, 2016.
International Preliminary Report dated Sep. 11, 2009.
International Preliminary Report dated Oct. 29, 2009.
International Preliminary Report dated Jun. 10, 2010.
International Search Report dated May 1, 2008.
International Search Report dated Jun. 3, 2008.
International Search Report dated Nov. 18, 2008.
Nadkarni, R.A., "Ash Sulfated Ash From Lubricating Oils and Additives: D874," Guide to ASTM Test Methods: 2nd Edition, 34-35 (ASTM International) (2007).

(Continued)

*Primary Examiner* — John R Hardee
(74) *Attorney, Agent, or Firm* — Finnegan, Henderson, Farabow, Garrett & Dunner LLP

(57) ABSTRACT

The working fluid composition for a refrigerating machine of the invention is characterized by comprising an ester of a polyhydric alcohol and a fatty acid with a content of a C5-C9 branched fatty acid of 50-100% by mole, and a fluoropropene refrigerant and/or trifluoroiodomethane refrigerant. The refrigerating machine oil of the invention is characterized by comprising an ester of a polyhydric alcohol and a fatty acid with a content of a C5-C9 branched fatty acid of 50-100% by mole, and by being used together with a fluoropropene refrigerant and/or trifluoroiodomethane refrigerant.

6 Claims, No Drawings

(56) References Cited

U.S. PATENT DOCUMENTS

| | | | |
|---|---|---|---|
| 6,998,065 B1 | 2/2006 | Hasegawa | |
| 7,018,558 B2 | 3/2006 | Schnur et al. | |
| 7,052,626 B1 | 5/2006 | Hasegawa et al. | |
| 7,074,571 B2 | 7/2006 | Bejanin et al. | |
| 7,074,751 B2 | 7/2006 | Singh et al. | |
| 7,507,348 B2 | 3/2009 | Kajiki et al. | |
| 7,569,170 B2 | 8/2009 | Minor | |
| 7,794,619 B2 | 9/2010 | Kajiki et al. | |
| 7,993,543 B2 | 8/2011 | Tagawa et al. | |
| 2001/0027655 A1 | 10/2001 | Tazaki | |
| 2002/0123436 A1 | 9/2002 | Osumi et al. | |
| 2004/0157753 A1 | 8/2004 | Tazaki et al. | |
| 2004/0209789 A1 | 10/2004 | Swallow et al. | |
| 2005/0127320 A1 | 6/2005 | Fahl et al. | |
| 2006/0033072 A1* | 2/2006 | Wilson | C09K 3/30 252/67 |
| 2006/0128576 A1 | 6/2006 | Tazaki | |
| 2006/0243944 A1 | 11/2006 | Minor et al. | |
| 2006/0243945 A1 | 11/2006 | Minor et al. | |
| 2006/0255313 A1 | 11/2006 | Yamada et al. | |
| 2007/0032391 A1 | 2/2007 | Tagawa et al. | |
| 2007/0108403 A1 | 5/2007 | Sievert et al. | |
| 2007/0213239 A1 | 9/2007 | Kaneko | |
| 2007/0257229 A1 | 11/2007 | Tagawa et al. | |
| 2008/0111100 A1 | 5/2008 | Thomas | |
| 2008/0157022 A1 | 7/2008 | Singh et al. | |
| 2008/0230738 A1 | 9/2008 | Minor | |
| 2009/0200507 A1 | 8/2009 | Tagawa et al. | |
| 2009/0305876 A1 | 12/2009 | Singh | |
| 2010/0038583 A1 | 2/2010 | Shimomura | |
| 2010/0051854 A1 | 3/2010 | Sawada | |
| 2010/0190672 A1* | 7/2010 | Carr et al. | |
| 2011/0248206 A1 | 10/2011 | Kaneko | |
| 2012/0187330 A1 | 7/2012 | Singh | |

FOREIGN PATENT DOCUMENTS

| | | |
|---|---|---|
| CN | 1433457 | 7/2003 |
| CN | 1732243 | 2/2006 |
| CN | 101622332 | 11/2013 |
| EP | 0 568 348 | 11/1993 |
| EP | 0 571 091 | 11/1993 |
| EP | 0 992 572 A2 | 4/2000 |
| EP | 1 203 807 | 5/2002 |
| EP | 1 712 607 | 10/2006 |
| EP | 2 138 559 A1 | 12/2009 |
| EP | 2 161 323 | 3/2010 |
| EP | 2 256 789 A2 | 12/2010 |
| JP | 56-131548 | 10/1981 |
| JP | 2-242888 | 9/1990 |
| JP | 3-88892 | 4/1991 |
| JP | 3-128991 | 5/1991 |
| JP | 3-128992 | 5/1991 |
| JP | 3-200895 | 9/1991 |
| JP | 3-217495 | 9/1991 |
| JP | 3-227397 | 10/1991 |
| JP | 3-505602 | 12/1991 |
| JP | 4-20597 | 1/1992 |
| JP | 4-72390 | 3/1992 |
| JP | 4-183788 | 6/1992 |
| JP | 4-218592 | 8/1992 |
| JP | 4-249593 | 9/1992 |
| JP | 5-001291 | 1/1993 |
| JP | 6-25690 | 2/1994 |
| JP | 6-501518 | 2/1994 |
| JP | 6-108081 | 4/1994 |
| JP | 6-128578 | 5/1994 |
| JP | 6-145104 | 5/1994 |
| JP | 9-169991 | 6/1997 |
| JP | 10-204458 | 8/1999 |
| JP | 11-236584 | 8/1999 |
| JP | 2000-073080 | 3/2000 |
| JP | 2000-104084 | 4/2000 |
| JP | 2000-297753 | 10/2000 |
| JP | 2000-319676 | 11/2000 |
| JP | 2001-002615 A | 1/2001 |
| JP | 2001-506672 | 5/2001 |
| JP | 2003-176488 | 6/2003 |
| JP | 2005-514492 | 5/2005 |
| JP | 2006-512426 | 4/2006 |
| JP | 2006-274177 | 10/2006 |
| JP | 2007-510039 | 4/2007 |
| JP | 2007-262208 | 10/2007 |
| JP | 2007-332134 | 12/2007 |
| JP | 2008-115266 | 5/2008 |
| JP | 2008-208261 | 9/2008 |
| JP | 2008-208262 | 9/2008 |
| JP | 2008-266423 | 11/2008 |
| JP | 2009-143970 | 7/2009 |
| JP | 5914912 B2 | 5/2016 |
| KR | 1019960037796 | 11/1996 |
| KR | 1001334610000 | 12/1997 |
| KR | 10-2006-0103324 | 9/2006 |
| KR | 1020060103324 | 9/2006 |
| RU | 2 042 710 C1 | 8/1995 |
| RU | 2 184 133 C2 | 6/2002 |
| TW | 200634141 | 10/2006 |
| WO | WO 90/005172 | 5/1990 |
| WO | WO 90/12849 | 11/1990 |
| WO | WO 93/001249 | 1/1993 |
| WO | WO 97/011933 | 4/1997 |
| WO | WO 2005/012469 A1 | 2/2005 |
| WO | WO 2005/042663 A1 | 5/2005 |
| WO | WO 2005/085402 A1 | 9/2005 |
| WO | WO 2005/103190 A1 | 11/2005 |
| WO | WO 2005/103191 A2 | 11/2005 |
| WO | WO 2005/103192 A1 | 11/2005 |
| WO | WO 2006/069362 A2 | 6/2006 |
| WO | WO 2006/094303 A | 9/2006 |
| WO | WO 2007/105718 | 9/2007 |
| WO | WO 2007/105781 | 9/2007 |
| WO | WO 2007/108484 A1 | 9/2007 |
| WO | WO 2008/153106 | 12/2008 |

OTHER PUBLICATIONS

Office Action for EP Counterpart Application No. 08 711 917.8 dated Jun. 3, 2015.

Notice of Allowance for Counterpart KR Patent Application No. 10-2009-7004747 dated Apr. 28, 2015.

Office Action for KR Counterpart Application No. 10-2009-7004747 dated Oct. 28, 2014.

Office Action for VN Counterpart Application No. 1-2009-01850 dated Nov. 7, 2014.

Office Action for CN Counterpart Application No. 201310492228.2 dated Sep. 12, 2014.

Office Action for JP Counterpart Application No. P2013-167653 dated Aug. 19, 2014.

European Search Report dated Aug. 2, 2011.

Russian Office Action dated Jul. 28, 2011.

Supplementary European Search Report dated Apr. 12, 2011.

Office Action for Counterpart RU Application No. 2012116513 dated Apr. 4, 2014.

Office Action issued in Japanese Patent Appilcation No. 2009-539015 dated Oct. 8, 2013.

Search Report issued by the European Patent Office in Application No. EP 08711917.8 dated Nov. 15, 2013.

Office Action for Counterpart JP Application No. P2007-280594 dated Jun. 25, 2013.

Office Action for Counterpart Application No. JP P2007-280601 dated Jun. 11, 2013.

Notice of Allowance issued in RU Application No. 2010121871 dated Aug. 23, 2012.

Office Action issued in CN Application No. 200880111858.8 dated Sep. 5, 2012.

Office Action for CN Appiication No. 200880001331.X dated Jan. 18, 2012.

Office Action for RU Application No. 2010121871 dated Apr. 9, 2012.

(56) References Cited

OTHER PUBLICATIONS

Chinese Office Action in Chinese Counterpart Application No. 200880000976.1 dated Nov. 24, 2011.
Office Action in counterpart Chinese Patent Application No. 201610179829.1, dated Nov. 3, 2016.

* cited by examiner

US 10,214,671 B2

REFRIGERATOR OIL AND WORKING FLUID COMPOSITION FOR REFRIGERATOR

CROSS-REFERENCE TO RELATED APPLICATIONS

This Application is a continuation of application Ser. No. 12/528,502, filed Aug. 25, 2009 now U.S. Pat. No. 9,321,948, which is a national phase application of International Application No. PCT/JP2008/053182, filed Feb. 25, 2008, and claims the priority of Japanese Application Nos. 2007-047592, filed Feb. 27, 2007; 2007-221519, filed Aug. 28, 2007; and 2007-280594, filed Oct. 29, 2007, the contents of all of which are incorporated herein by reference.

TECHNICAL FIELD

The present invention relates to a refrigerating machine oil and to a working fluid composition for a refrigerating machine.

BACKGROUND ART

In light of the problem of ozone layer depletion which is of note in recent years, the restrictions on CFCs (chlorofluorocarbons) and HCFCs (hydrochlorofluorocarbons) that are used as refrigerants in conventional refrigerating machines have become more stringent, and HFCs (hydrofluorocarbons) are coming into use as substitute refrigerants.

Mineral oils or hydrocarbon oils such as alkylbenzene are preferably used as refrigerating machine oils when CFCs or HCFCs are the refrigerants, but since changing the refrigerant can cause the refrigerating machine oil used with it to exhibit unpredictable behavior in terms of its compatibility with the refrigerant, lubricity, dissolved viscosity with the refrigerant and thermal and chemical stability, it has been necessary to develop different refrigerating machine oils for different refrigerants. Examples of refrigerating machine oils that have been developed for HFC refrigerants include polyalkylene glycols (see Patent document 1), esters (see Patent document 2), carbonic acid esters (see Patent document 3) and polyvinyl ethers (see Patent document 4).

HFC-134a is an HFC refrigerant that is routinely used as a refrigerant for automobile air conditioners, and while it has an ozone depletion potential (ODP) of zero, its high global warming potential (GWP) has led to its restriction in Europe. It has therefore become an urgent issue to develop refrigerants that can be used as substitutes for HFC-134a.

In light of this background it has been proposed to use, as substitute refrigerants for HFC-134a, fluoropropene refrigerants which have very low ODP and GWP, are noncombustible and are comparable or superior to HFC-134a in terms of their thermodynamic properties, as a measure of refrigerant performance. There has also been proposed the use of refrigerant mixtures of fluoropropene with saturated hydrofluorocarbons, C3-05 saturated hydrocarbons, dimethyl ether, carbon dioxide, bis(trifluoromethyl)sulfide or trifluoroiodomethane (see Patent document 5).

In addition, there have been proposed refrigerating machine oils that employ mineral oils, alkylbenzenes, poly α-olefins, polyalkyleneglycols, monoesters, diesters, polyol esters, phthalic acid esters, alkyl ethers, ketones, carbonic acid esters, polyvinyl ethers and the like, as refrigerating machine oils that can be used with fluoropropene refrigerants or refrigerant mixtures of fluoropropene and saturated hydrofluorocarbons, C3-05 saturated hydrocarbons, dimethyl ether, carbon dioxide, bis(trifluoromethyl)sulfide or trifluoroiodomethane (see Patent documents 5-7).

[Patent document 1] Japanese Unexamined Patent Publication HEI No. 02-242888
[Patent document 2] Japanese Unexamined Patent Publication HEI No. 03-200895
[Patent document 3] Japanese Unexamined Patent Publication HEI No. 03-217495
[Patent document 4] Japanese Unexamined Patent Publication HEI No. 06-128578
[Patent document 5] International Patent Publication No. WO2006/094303
[Patent document 6] Japanese Patent Public Inspection No. 2006-512426
[Patent document 7] International Patent Publication No. WO2005/103190

DISCLOSURE OF THE INVENTION

Problems to be Solved by the Invention

In a refrigeration system employing a fluoropropene refrigerant and/or a trifluoroiodomethane refrigerant, as described in Patent documents 5, 6 and 7, the refrigerating machine oil employed may be a mineral oil or a hydrocarbon such as an alkylbenzene which is used in CFCs or HCFCs or a polyalkylene glycol, polyol ester or polyvinyl ether which is used in HFCs. Based on investigation by the present inventors, however, it is not possible to achieve a high level of refrigerant compatibility and thermal/chemical stability simply by applying conventional refrigerating machine oils used for refrigerants such as CFCs and HCFCs in the systems mentioned above.

It is therefore an object of the present invention, which has been accomplished in light of these circumstances, to provide a refrigerating machine oil and a working fluid composition for a refrigerating machine, which can achieve a high level of both refrigerant compatibility and thermal/chemical stability in refrigeration systems employing fluoropropene refrigerants and/or trifluoroiodomethane refrigerants.

Means for Solving the Problems

As a result of much diligent research directed toward achieving the object stated above, the present inventors have found that by using an ester of a fatty acid having a specific fatty acid composition and a polyhydric alcohol, it is possible to obtain a refrigerating machine oil with sufficient thermal/chemical stability in the co-presence of a fluoropropene refrigerant and/or trifluoroiodomethane refrigerant, and having sufficient compatibility with refrigerants, and the invention has been completed upon this finding.

Specifically, the invention provides a working fluid composition for a refrigerating machine characterized by comprising an ester of a polyhydric alcohol and a fatty acid with a content of a C5-C9 branched fatty acid of 50-100% by mole, and a fluoropropene refrigerant and/or trifluoroiodomethane refrigerant.

The invention further provides a refrigerating machine oil characterized by comprising an ester of a polyhydric alcohol and a fatty acid with a content of a C5-C9 branched fatty acid of 50-100% by mole, and by being used together with a fluoropropene refrigerant and/or trifluoroiodomethane refrigerant.

The working fluid composition for a refrigerating machine of the invention preferably contains at least one selected from among 1,3,3,3-tetrafluoropropene (HFO-1234ze) and 2,3,3,3-tetrafluoropropene (HFO-1234yf) as the fluoropropene refrigerant.

The working fluid composition for a refrigerating machine of the invention also preferably contains at least one fluoropropene refrigerant (hereinafter referred to as "refrigerant (A)") and at least one selected from among saturated hydrofluorocarbons, C3-C5 hydrocarbons, dimethyl ether, carbon dioxide, bis(trifluoromethyl)sulfide and trifluoroiodomethane refrigerants (hereinafter referred to as "refrigerant (B)").

In a refrigerant mixture comprising refrigerant (A) and refrigerant (B), the fluoropropene refrigerant is preferably at least one selected from among 1,2,3,3,3-pentafluoropropene (HFC-1225ye), 1,3,3,3-tetrafluoropropene (HFC-1234 ze), 2,3,3,3-tetrafluoropropene (HFC-1234yf), 1,2,3,3-tetrafluoropropene (HFC1234ye) and 3,3,3-trifluoropropene (HFC-1243zf);

the saturated hydrofluorocarbon is preferably at least one selected from among difluoromethane (HFC-32), pentafluoroethane (HFC-125), 1,1,2,2-tetrafluoroethane (HFC-134), 1,1,1,2-tetrafluoro ethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc); and the C3-C5 hydrocarbon is preferably at least one selected from among propane, n-butane, isobutane, 2-methylbutane and n-pentane.

Effect of the Invention

As mentioned above, the present invention can provide a refrigerating machine oil and a working fluid composition for a refrigerating machine, which can achieve a high level of both refrigerant compatibility and thermal/chemical stability in refrigeration systems employing fluoropropene refrigerants and/or trifluoroiodomethane refrigerants.

BEST MODE FOR CARRYING OUT THE INVENTION

Preferred embodiments of the invention will now be described in detail.

The refrigerating machine oil of the invention is characterized by comprising an ester of a polyhydric alcohol and a fatty acid with a content of a C5-C9 branched fatty acid of 50-100% by mole, and by being used together with a fluoropropene refrigerant and/or trifluoroiodomethane refrigerant.

Specifically, the invention provides a working fluid composition for a refrigerating machine characterized by comprising an ester of a polyhydric alcohol and a fatty acid with a content of a C5-C9 branched fatty acid of 50-100% by mole, and a fluoropropene refrigerant and/or trifluoroiodomethane refrigerant. This includes a mode wherein the working fluid composition for a refrigerating machine of the invention comprises a refrigerating machine oil of the invention and a fluoropropene refrigerant and/or trifluoroiodomethane refrigerant.

The refrigerating machine oil and working fluid composition for a refrigerating machine of the invention comprise an ester of a polyhydric alcohol and a fatty acid with a content of a C5-C9 branched fatty acid of 50-100% by mole (hereinafter referred to as "polyol ester according to the invention").

The proportion of C5-C9 branched fatty acids in the fatty acid of the polyol ester according to the invention (hereinafter referred to as "constituent fatty acid") is 50-100% by mole as mentioned above, but it is preferably 60-100% by mole, more preferably 70-100% by mole, even more preferably 90-100% by mole and most preferably 100% by mole. If the C5-C9 branched fatty acid content is less than 50% by mole, the thermal/chemical stability and refrigerant compatibility will be insufficient in the copresence of a fluoropropene refrigerant and/or trifluoroiodomethane refrigerant.

As specific C5-C9 branched fatty acids there may be mentioned branched pentanoic acids, branched hexanoic acids, branched heptanoic acids, branched octanoic acids and branched nonanoic acids. More specifically, fatty acids branched at the α- and/or β-position are preferred, with 2-methylbutanoic acid, 2-methylpentanoic acid, 2-methylhexanoic acid, 2-ethylpentanoic acid, 2-methylheptanoic acid, 2-ethylhexanoic acid and 3,5,5-trimethylhexanoic acid being especially preferred and mixtures of 2-ethylhexanoic acid and 3,5,5-trimethylhexanoic acid being most preferred.

The constituent fatty acids may include only branched fatty acids or they may be mixtures of branched fatty acids and straight-chain fatty acids, so long as the aforementioned condition of the C5-C9 branched fatty acid content is satisfied. The constituent fatty acids may also contain fatty acids other than C5-C9 branched fatty acids. As examples of fatty acids other than C5-C9 branched fatty acids there may be mentioned C5-C24 straight-chain fatty acids and C10-C24 branched fatty acids, and more specifically straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched nonadecanoic acid, straight-chain or branched eicosanoic acid, straight-chain or branched heneicosanoic acid, straight-chain or branched docosanoic acid, straight-chain or branched tricosanoic acid, straight-chain or branched tetracosanoic acid, straight-chain pentanoic acid, straight-chain hexanoic acid, straight-chain heptanoic acid, straight-chain octanoic acid, straight-chain nonanoic acid and the like.

The polyhydric alcohol in the polyol ester according to the invention is preferably a polyhydric alcohol with 2 to 6 hydroxyl groups.

As specific examples of dihydric alcohols (diols) there may be mentioned ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol and the like. As specific examples of trihydric and greater alcohols there may be mentioned polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (glycerin 2-3mers), 1,3,5-pentanetriol, sorbitol, sorbitan, sorbitolglycerin condensation products, adonitol, arabitol, xylitol, mannitol and the like, saccharides such as xylose, arabinose, ribose, rhamnose, glucose, fructose, galactose, mannose, sorbose and cellobiose, and partial etherified forms thereof. Preferred among these are hindered alcohols such as neopentyl glycol, trimethylolethane, trimethylolpropane, trimethylolbutane, di-(trimethylolpropane), tri-(trimethylolpropane), pentaerythritol and di-(pentaerythritol).

A polyol ester according to the invention may be a partial ester with a portion of the hydroxyl groups of the polyhydric alcohol remaining as hydroxyl groups without esterification, a complete ester with all of the hydroxyl groups esterified, or a mixture of a partial ester and a complete ester, but the hydroxyl number is preferably not greater than 10 mgKOH/g, even more preferably not greater than 5 mgKOH/g and most preferably not greater than 3 mgKOH/g.

For more excellent hydrolytic stability, the polyol ester according to the invention is more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol) or tri-(pentaerythritol), even more preferably an ester of neopentyl glycol, trimethylolethane, trimethylolpropane, trimethylolbutane or pentaerythritol, even more preferably an ester of pentaerythritol, trimethylolpropane or neopentyl glycol, and most preferably an ester of pentaerythritol or of a pentaerythritol and di-(pentaerythritol) mixed ester, because of their especially superior compatibility with refrigerants and hydrolytic stability.

The refrigerating machine oil and working fluid composition for a refrigerating machine of the invention may contain, as the polyol ester according to the invention, a single polyol ester with a single structure, or a mixture of two or more polyol esters with different structures.

The polyol ester according to the invention may be an ester of one fatty acid and one polyhydric alcohol, an ester of two or more fatty acids and one polyhydric alcohol, an ester of one fatty acid and two or more polyhydric alcohols, or an ester of two or more fatty acids and two or more polyhydric alcohols. Of these, polyol esters employing mixed fatty acids and especially polyol esters comprising two or more fatty acids in the ester molecule, are particularly preferred because they have excellent low-temperature characteristics and compatibility with refrigerants.

There are no particular restrictions on the content of the polyol ester according to the invention in a refrigerating machine oil of the invention, but for more excellent performance including lubricity, refrigerant compatibility, thermal/chemical stability and electrical insulating properties, the content is preferably at least 50% by mass, more preferably at least 70% by mass, even more preferably at least 80% by mass and most preferably at least 90% by mass, based on the total amount of the refrigerating machine oil.

The refrigerating machine oil of the invention may consist entirely of a polyol ester according to the invention, or it may further contain a base oil other than the polyol ester, and various additives. The working fluid composition for a refrigerating machine of the invention may also further contain a base oil other than the polyol ester according to the invention, and various additives. In the explanation which follows, the contents of the base oils other than polyol esters according to the invention and of the additives are given based on the total amount of the refrigerating machine oil, and the contents of these components in the refrigerating machine fluid composition are preferably selected to be within the preferred ranges specified below, based on the total amount of refrigerating machine oil.

As base oils other than the polyol ester according to there may be used hydrocarbon-based oils including mineral oils, olefin polymers, naphthalene compounds, alkylbenzenes and the like, esteric base oils other than polyol esters according to (monoesters, and polyol esters containing only straight-chain fatty acids as constituent fatty acids), and oxygen-containing synthetic oils such as polyglycols, polyvinyl ethers, ketones, polyphenyl ethers, silicones, polysiloxanes and perfluoroethers. Preferred oxygen-containing synthetic oils among these are polyglycols, polyvinyl ethers and ketones.

If necessary, the refrigerating machine oil of the invention may be used in a form that further contains various additives. In the explanation which follows, the additive contents are given based on the total amount of the refrigerating machine oil composition, and the contents of these components in the refrigerating machine fluid composition are preferably selected to be within the preferred ranges specified below, based on the total amount of the refrigerating machine oil composition.

In order to further enhance the antiwear property and load carrying capacity of the refrigerating machine oil and the working fluid composition for a refrigerating machine of the invention there may be added one or more phosphorus compounds selected from the group consisting of phosphoric acid esters, acidic phosphoric acid esters, thiophosphoric acid esters, acidic phosphoric acid ester amine salts, chlorinated phosphoric acid esters and phosphorous acid esters. These phosphorus compounds are esters of phosphoric acid or phosphorous acid with alkanols or polyether alcohols, or derivatives thereof.

As specific examples of phosphoric acid esters there may be mentioned tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, xylenyldiphenyl phosphate and the like.

As acidic phosphoric acid esters there may be mentioned monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, dioleyl acid phosphate and the like.

As thiophosphoric acid esters there may be mentioned tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, xylenyldiphenyl phosphorothionate and the like.

As amine salts of acidic phosphoric acid esters there may be mentioned salts of amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine, of the aforementioned acidic phosphoric acid esters.

As chlorinated phosphoric acid esters there may be mentioned Tris-dichloropropyl phosphate, Tris-chloroethyl phosphate, Tris-chlorophenyl phosphate, polyoxyalkylene-bis[di(chloroalkyl)]phosphate and the like. As phosphorous acid esters there may be mentioned dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, tricresyl phosphite and the like. Mixtures of the above compounds may also be used.

When the refrigerating machine oil and working fluid composition for a refrigerating machine of the invention contains such phosphorus compounds, the phosphorus compound content is not particularly restricted but is preferably 0.01-5.0% by mass and more preferably 0.02-3.0% by mass based on the total amount of the refrigerating machine oil (the total amount of the base oil and all of the additives). A single phosphorus compound may be used or two or more may be used in combination.

In order to further improve the thermal/chemical stability of the refrigerating machine oil and working fluid composition for a refrigerating machine of the invention, it may contain one or more epoxy compounds selected from among phenylglycidyl ether-type epoxy compounds, alkylglycidyl ether-type epoxy compounds, glycidyl ester-type epoxy compounds, allyloxirane compounds, alkyloxirane compounds, alicyclic epoxy compounds, epoxidated fatty acid monoesters and epoxidated vegetable oils.

Specific examples of phenylglycidyl ether-type epoxy compounds include phenylglycidyl ethers and alkylphenylglycidyl ethers. An alkylphenylglycidyl ether is one having one to three C1-C13 alkyl groups, and preferred examples with one C4-C10 alkyl group include n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether.

Specific examples of alkylglycidyl ether-type epoxy compounds include decylglycidyl ether, undecylglycidyl ether, dodecylglycidyl ether, tridecylglycidyl ether, tetradecylglycidyl ether, 2-ethylhexylglycidyl ether, neopentylglycol diglycidyl ether, trimethylolpropanetriglycidyl ether, pentaerythritoltetraglycidyl ether, 1,6-hexanediol diglycidyl ether, sorbitolpolyglycidyl ether, polyalkyleneglycol monoglycidyl ethers, polyalkyleneglycol diglycidyl ethers and the like.

As specific examples of glycidyl ester-type epoxy compounds there may be mentioned phenylglycidyl esters, alkylglycidyl esters and alkenylglycidyl esters, among which preferred examples include glycidyl-2,2-dimethyl octanoate, glycidyl benzoate, glycidyl acrylate and glycidyl methacrylate.

Specific examples of allyloxirane compounds include 1,2-epoxystyrene and alkyl-1,2-epoxystyrene.

Specific examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

Specific examples of alicyclic epoxy compounds include 1,2-epoxycyclohexane, 1,2-epoxycyclopentane, 3,4-epoxycyclohexylmethyl-3,4-epoxycyclohexane carboxylate, bis (3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, 4-epoxyethyl-1,2-epoxycyclohexane and the like.

Specific examples of epoxidated fatty acid monoesters include epoxidated esters of C12-C20 fatty acids and C1-C8 alcohols, phenols or alkylphenols. Most preferably used are butyl, hexyl, benzyl, cyclohexyl, methoxyethyl, octyl, phenyl and butylphenyl esters of epoxystearic acid.

Specific examples of epoxidated vegetable oils include epoxy compounds of vegetable oils such as soybean oil, linseed oil and cottonseed oil.

Preferred among these epoxy compounds are phenylglycidyl ether-type epoxy compounds, glycidyl ester-type epoxy compounds, alicyclic epoxy compounds and epoxidated fatty acid monoesters. More preferred among these are phenylglycidyl ether-type epoxy compounds and glycidyl ester-type epoxy compounds, with phenylglycidyl ether, butylphenylglycidyl ether, alkylglycidyl ester or mixtures thereof being especially preferred.

When the refrigerating machine oil and working fluid composition for a refrigerating machine of the invention contains such epoxy compounds, the epoxy compound content is not particularly restricted but is preferably 0.1-5.0% by mass and more preferably 0.2-2.0% by mass based on the total amount of the refrigerating machine oil. A single epoxy compound may be used, or two or more may be used in combination.

In order to further increase the performance of the refrigerating machine oil and working fluid composition for a refrigerating machine of the invention, conventionally known refrigerating machine oil additives may be included as necessary. As examples of such additives there may be mentioned phenol-based antioxidants such as di-tert-butyl-p-cresol and bisphenol A, amine-based antioxidants such as phenyl-α-naphthylamine and N,N-di(2-naphthyl)-p-phenylenediamine, antiwear agents such as zinc dithiophosphate, extreme-pressure agents such as chlorinated paraffins and sulfur compounds, oiliness agents such as fatty acids, silicone-based and other types of antifoaming agents, metal deactivators such as benzotriazoles, viscosity index improvers, pour point depressants, detergent dispersants and the like. Such additives may be used alone or in combinations of two or more. There are no particular restrictions on the content of such additives, but it is preferably not greater than 10% by mass and more preferably not greater than 5% by mass based on the total amount of the refrigerating machine oil.

The kinematic viscosity of the refrigerating machine oil of the invention is not particularly restricted, but the kinematic viscosity at 40° C. is preferably 3-1000 mm$^2$/s, more preferably 4-500 mm²/s and most preferably 5-400 mm²/s. The kinematic viscosity at 100° C. is preferably 1-100 mm²/s and more preferably 2-50 mm²/s.

The volume resistivity of the refrigerating machine oil of the invention is also not particularly restricted, but is preferably $1.0 \times 10^{12}$ Ω·cm or greater, more preferably $1.0 \times 10^{13}$ Ω·cm or greater and most preferably $1.0 \times 10^{14}$ Ω·cm or greater. High electrical insulating properties will usually be required for use in hermetic type refrigerating machines. According to the invention, the volume resistivity is the value measured according to JIS C 2101, "Testing methods of electrical insulation oils", at 25° C.

The moisture content of the refrigerating machine oil of the invention is not particularly restricted but is preferably not greater than 200 ppm, more preferably not greater than 100 ppm and most preferably not greater than 50 ppm based on the total amount of the refrigerating machine oil. A lower moisture content is desired from the viewpoint of effect on the thermal/chemical stability and electrical insulating properties of the refrigerating machine oil, especially for use in hermetic type refrigerating machines.

The acid value of the refrigerating machine oil of the invention is also not particularly restricted, but in order to prevent corrosion of metals used in the refrigerating machine or pipings, and in order to prevent decomposition of the ester in the refrigerating machine oil of the invention, it is preferably not greater than 0.1 mgKOH/g and more preferably not greater than 0.05 mgKOH/g. According to the invention, the acid value is the value measured based on JIS K2501, "Petroleum products and lubricants-Determination of neutralization number".

The ash content of the refrigerating machine oil of the invention is not particularly restricted, but in order to increase the thermal/chemical stability of the refrigerating machine oil of the invention and inhibit generation of sludge, it is preferably not greater than 100 ppm and more preferably not greater than 50 ppm. According to the invention, the ash content is the value measured based on JIS K2272, "Crude oil and petroleum products-Determination of ash and sulfates ash".

The refrigerating machine oil of the invention is used together with a fluoropropene refrigerant and/or trifluoroiodomethane refrigerant, and the working fluid composition for a refrigerating machine of the invention comprises a fluoropropene refrigerant and/or a trifluoroiodomethane refrigerant. The refrigerant used for the invention may consist of either a fluoropropene refrigerant or trifluoroiodomethane refrigerant alone, or it may be a refrigerant mixture comprising a fluoropropene refrigerant and a trifluoroiodomethane refrigerant.

Preferred fluoropropene refrigerants are fluoropropenes with 3-5 fluorine atoms, among which one or mixtures of two or more from among 1,2,3,3,3-pentafluoropropene (HFC-1225ye), 1,3,3,3-tetrafluoropropene (HFC-1234ze), 2,3,3,3-tetrafluoropropene (HFC-1234yf), 1,2,3,3-tetrafluoropropene (HFC-1234ye) and 3,3,3-trifluoropropene (HFC-1243zf) are preferred. From the viewpoint of refrigerant properties, it is preferred to use one or more selected from among HFC-1225ye, HFC-1234ze and HFC-1234yf.

The refrigerant used for the invention may also be a refrigerant mixture comprising a fluoropropene refrigerant and a trifluoroiodomethane refrigerant with another refrigerant. As other refrigerants there may be mentioned HFC refrigerants, fluorinated ether-based refrigerants such as perfluoroethers, dimethyl ether, and natural refrigerants including ammonia, hydrocarbons and the like.

As HFC refrigerants there may be mentioned C1-C3 and preferably C1-C2 hydrofluorocarbons. As specific examples there may be mentioned difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365 mfc), as well as mixtures of two or more thereof. These refrigerants may be appropriately selected depending on the purpose of use and the required performance, but as preferred examples there may be mentioned HFC-32 alone; HFC-23 alone; HFC-134a alone; HFC-125 alone; HFC-134a/HFC-32=60-80% by mass/40-20% by mass mixture; HFC-32/HFC-125=40-70% by mass/60-30% by mass mixture: HFC-125/HFC-143a=40-60% by mass/60-40% by mass mixture; HFC-134a/HFC-32/HFC-125=60% by mass/30% by mass/10% by mass mixture; HFC-134a/HFC-32/HFC-125=40-70% by mass/15-35% by mass/5-40% by mass mixture; and HFC-125/HFC-134a/HFC-143a=35-55% by mass/1-15% by mass/40-60% by mass mixture. More specifically, there may be mentioned HFC-134a/HFC-32=70/30% by mass mixture; HFC-32/HFC-125=60/40% by mass mixture; HFC-32/HFC-125=50/50% by mass mixture (R410A); HFC-32/HFC-125=45/55% by mass mixture (R410B); HFC-125/HFC-143a=50/50% by mass mixture (R507C); HFC-32/HFC-125/HFC-134a=30/10/60% by mass mixture; HFC-32/HFC-125/HFC-134a=23/25/52% by mass mixture (R407C); HFC-32/HFC-125/HFC-134a=25/15/60% by mass mixture (R407E); and HFC-125/HFC-134a/HFC-143a=44/4/52% by mass mixture (R404A).

As saturated hydrofluorocarbons among HFC refrigerants, there are preferred one or mixtures of two or more selected from among difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365 mfc), and from the viewpoint of refrigerant properties there are especially preferred HFC-32, HFC-125, HFC-134a, HFC-152a and mixtures of HFC-32 and HFC-134a.

As hydrocarbon refrigerants there are preferred C3-C5 hydrocarbons, specific examples of which include methane, ethylene, ethane, propylene, propane, cyclopropane, n-butane, isobutane, cyclobutane, methylcyclopropane, 2-methylbutane, n-pentane, and mixtures of two or more thereof. Preferred among these are refrigerants that are gases at 25° C., under 1 atmosphere, such as propane, n-butane, isobutane, 2-methylbutane, and mixtures thereof.

As specific examples of fluorinated ether-based refrigerants there may be mentioned HFE-134p, HFE-245mc, HFE-236mf, HFE-236me, HFE-338mcf, HFE-365mcf, HFE-245mf, HFE-347mmy, HFE-347mcc, HFE-125, HFE-143m, HFE-134m, HFE-227me and the like, and these refrigerants may be appropriately selected depending on the purpose of use and the required performance.

When the refrigerant used for the invention is a refrigerant mixture, the refrigerant mixture preferably contains at least one selected from among fluoropropene refrigerants (hereinafter referred to as "refrigerant (A)") and at least one selected from among saturated hydrofluorocarbon, C3-C5 hydrocarbon, dimethyl ether, carbon dioxide, bis(trifluoromethyl)sulfide and trifluoroiodomethane refrigerants (hereinafter referred to as "refrigerant (B)").

When the refrigerant used for the invention is a refrigerant mixture comprising refrigerant (A) and refrigerant (B), the refrigerant mixture is preferably an azeotropic mixture, but it does not need to be an azeotropic mixture so long as it has the properties required as a refrigerant, and the mixing ratio of both components is preferably 1:99-99:1 and more preferably 5:95-95:5.

Also, when the refrigerant used for the invention is a refrigerant mixture comprising refrigerant (A) and refrigerant (B), the refrigerant mixture may further contain an HFC refrigerant other than the fluoropropene refrigerant or saturated hydrofluorocarbon, a fluorinated ether-based refrigerant such as a perfluoroether, a hydrocarbon other than a C3-C5 hydrocarbon, or a natural refrigerant such as ammonia.

The refrigerating machine oil of the invention will normally be used in a refrigerating air conditioner in the form of the aforementioned fluid composition for the refrigerating machine, in admixture with the fluoropropene refrigerant and/or the trifluoroiodomethane refrigerant, or the refrigerant mixture. There are no particular restrictions on the mixing proportion of the refrigerating machine oil and refrigerant in the composition, and the mixing proportion of the refrigerating machine oil and refrigerant in the working fluid composition for a refrigerating machine of the invention, but the refrigerating machine oil content is preferably 1-500 parts by mass and more preferably 2-400 parts by mass with respect to 100 parts by mass of the refrigerant.

The refrigerating machine oil and working fluid composition for a refrigerating machine of the invention is preferably used in an air conditioner or refrigerator with a reciprocating or rotating hermetic type compressor, or in an open or closed automobile air conditioner. The refrigerating machine oil and working fluid composition for a refrigerating machine of the invention may also be suitably used in cooling devices of dehumidifiers, water heater, freezers, cold storage/refrigerated warehouses, automatic vending machines, showcases, chemical plants and the like. The refrigerating machine oil and working fluid composition for a refrigerating machine of the invention may also be suitably used in devices with centrifugal compressors.

EXAMPLES

The present invention will now be explained in greater detail based on examples and comparative examples, with the understanding that these examples are in no way limitative on the invention.

Examples 1-9, Comparative Examples 1-4

For Examples 1-9 and Comparative Examples 1-4, refrigerating machine oils were prepared using base oils 1-13 listed below. The properties of the obtained refrigerating machine oils are shown in Tables 1-3.

(Base Oils)

Base oil 1: Ester of 2-ethylhexanoic acid and neopentyl glycol

Base oil 2: Ester of 2-ethylhexanoic acid and trimethylolpropane

Base oil 3: Ester of 2-ethylhexanoic acid and pentaerythritol

Base oil 4: Ester of fatty acid mixture of 2-ethylhexanoic acid and 3,5,5-trimethylhexanoic acid (mixing ratio (molar ratio): 50/50) and pentaerythritol Base oil 5: Ester of fatty acid mixture of 2-ethylhexanoic acid and 3,5,5-trimethylhexanoic acid (mixing ratio (molar ratio): 50/50) and dipentaerythritol Base oil 6: Ester of fatty acid mixture of n-heptanoic acid and 3,5,5-trimethylhexanoic acid (mixing ratio (molar ratio): 15/85) and pentaerythritol Base oil 7: Mixture of base oil 1 and base oil 3 (mixing ratio (mass ratio): base oil 1/base oil 3=35/65)

Base oil 8: Mixture of base oil 1 and base oil 4 (mixing ratio (mass ratio): base oil 1/base oil 4=25/75)

Base oil 9: Mixture of base oil 4 and base oil 5 (mixing ratio (mass ratio): base oil 4/base oil 5=75/25)

Base oil 10: Ester of n-heptanoic acid and pentaerythritol

Base oil 11: Ester of fatty acid mixture of n-pentanoic acid, n-heptanoic acid and 3,5,5-trimethylhexanoic acid (mixing ratio (molar ratio): 45/10/45) and pentaerythritol Base oil 12: Naphthenic mineral oil Base oil 13: Polypropyleneglycol monomethyl ether Each of the refrigerating machine oils obtained in Examples 1-9 and Comparative Examples 1-4 was subjected to an evaluation test in the following manner.

(Refrigerant Compatibility Evaluation 1)

Following the procedure outlined in "Refrigerant Compatibility Test Method" under "Refrigerating machine Oils" of JIS-K-2211, 2 g of refrigerating machine oil was combined with 18 g of a refrigerant mixture of 2,3,3,3-tetrafluoropropene and trifluoroiodomethane (mixing ratio (mass ratio): 2,3,3,3-tetrafluoropropene/trifluoroiodomethane=70/30), and it was observed whether the refrigerant and refrigerating machine oil mutually dissolved at 0° C. The results are shown in Tables 1-3. In Tables 1-3, "compatible" means that the refrigerant and refrigerating machine oil mutually dissolved, and "separated" means that the refrigerant and refrigerating machine oil separated into two layers.

(Refrigerant Compatibility Evaluation 2)

Following the procedure outlined in "Refrigerant Compatibility Test Method" under "Refrigerating machine Oils" of JIS-K-2211, 2 g of refrigerating machine oil was combined with 18 g of 2,3,3,3-tetrafluoropropene, and it was observed whether the refrigerant and refrigerating machine oil mutually dissolved at 0° C. The results are shown in Tables 1-3. In Tables 1-3, "compatible" means that the refrigerant and refrigerating machine oil mutually dissolved, and "separated" means that the refrigerant and refrigerating machine oil separated into two layers.

(Thermal/Chemical Stability Evaluation 1)

Following the procedure outlined in JIS-K-2211, 1 g of a refrigerating machine oil prepared to a moisture content of not greater than 10 ppm (initial ASTM color: L0.5) and 1 g of a refrigerant mixture of 2,3,3,3-tetrafluoropropene and trifluoroiodomethane (mixing ratio (mass ratio): 2,3,3,3-tetrafluoropropene/trifluoroiodomethane=70/30) were filled into a glass tube together with a catalyst (iron, copper and aluminum wires), and then heated to 150° C. and stored for one week for testing. After the test, the ASTM color of the refrigerating machine oil composition and the change in catalyst color were evaluated. The ASTM color was evaluated according to ASTM D1500. The change in catalyst color was determined by visual observation of the outer appearance, and evaluation was made as "no change", "no gloss" or "blackening". The results are shown in Tables 1 to 3.

(Thermal/Chemical Stability Evaluation 2)

Following the procedure outlined in JIS-K-2211, 1 g of a refrigerating machine oil prepared to a moisture content of not greater than 10 ppm (initial ASTM color: L0.5) and 1 g of 2,3,3,3-tetrafluoropropene were filled into a glass tube together with a catalyst (iron, copper and aluminum wires), and then heated to 150° C. and stored for one week for testing. After the test, the ASTM color of the refrigerating machine oil composition and the change in catalyst color were evaluated. The ASTM color was evaluated according to ASTM D1500. The change in catalyst color was determined by visual observation of the outer appearance, and evaluation was made as "no change", "no gloss" or "blackening". The results are shown in Tables 1 to 3.

TABLE 1

|  |  |  | Example 1 | Example 2 | Example 3 | Example 4 | Example 5 |
|---|---|---|---|---|---|---|---|
| Base oil No. |  |  | 1 | 2 | 3 | 4 | 5 |
| Kinematic viscosity at 40° C. (mm²/s) |  |  | 7.3 | 24.1 | 45.3 | 68.3 | 244 |
| Kinematic viscosity at 100° C. (mm²/s) |  |  | 2.0 | 4.2 | 6.3 | 8.3 | 19.2 |
| Proportion of C5-9 fatty acids among constituent fatty acids of ester (% by mole) |  |  | 100 | 100 | 100 | 100 | 100 |
| Refrigerant compatibility 1 |  |  | Compatible | Compatible | Compatible | Compatible | Compatible |
| Thermal/chemical stability 1 | ASTM color (ASTM D1500) |  | L0.5 | L0.5 | L0.5 | L0.5 | L0.5 |
|  | Catalyst appearance | Cu | No change | No change | No change | No change | No change |
|  |  | Fe | No change | No change | No change | No change | No change |
|  |  | Al | No change | No change | No change | No change | No change |
| Refrigerant compatibility 2 |  |  | Compatible | Compatible | Compatible | Compatible | Compatible |
| Thermal/chemical stability 2 | ASTM color (ASTM D1500) |  | L0.5 | L0.5 | L0.5 | L0.5 | L0.5 |
|  | Catalyst appearance | Cu | No change | No change | No change | No change | No change |
|  |  | Fe | No change | No change | No change | No change | No change |
|  |  | Al | No change | No change | No change | No change | No change |

TABLE 2

|  |  |  | Example 6 | Example 7 | Example 8 | Example 9 |
|---|---|---|---|---|---|---|
| Base oil No. |  |  | 6 | 7 | 8 | 9 |
| Kinematic viscosity at 40° C. (mm²/s) |  |  | 74.2 | 22.3 | 33.5 | 83.8 |
| Kinematic viscosity at 100° C. (mm²/s) |  |  | 9.2 | 4.1 | 5.4 | 9.6 |
| Proportion of C5-9 fatty acids among constituent fatty acids of ester (% by mole) |  |  | 85 | 100 | 100 | 100 |
| Refrigerant compatibility 1 |  |  | Compatible | Compatible | Compatible | Compatible |
| Thermal/chemical stability 1 | ASTM color (ASTM D1500) |  | L1.0 | L0.5 | L0.5 | L0.5 |
|  | Catalyst appearance | Cu | No gloss | No change | No change | No change |
|  |  | Fe | No gloss | No change | No change | No change |
|  |  | Al | No change | No change | No change | No change |
| Refrigerant compatibility 2 |  |  | Compatible | Compatible | Compatible | Compatible |
| Thermal/chemical stability 2 | ASTM color (ASTM D1500) |  | L0.5 | L0.5 | L0.5 | L0.5 |
|  | Catalyst appearance | Cu | No gloss | No change | No change | No change |
|  |  | Fe | No gloss | No change | No change | No change |
|  |  | Al | No change | No change | No change | No change |

TABLE 3

|  | Comparative Example 1 | Comparative Example 2 | Comparative Example 3 | Comparative Example 4 |
|---|---|---|---|---|
| Base oil No. | 10 | 11 | 12 | 13 |
| Kinematic viscosity at 40° C. (mm²/s) | 21.8 | 33.2 | 56.1 | 50.2 |
| Kinematic viscosity at 100° C. (mm²/s) | 4.7 | 5.8 | 5.9 | 9.9 |

TABLE 3-continued

|  |  |  | Comparative Example 1 | Comparative Example 2 | Comparative Example 3 | Comparative Example 4 |
|---|---|---|---|---|---|---|
| Proportion of C5-9 fatty acids among constituent fatty acids of ester (% by mole) | | | 0 | 45 | — | — |
| Refrigerant compatibility 1 | | | Compatible | Compatible | Separated | Compatible |
| Thermal/ chemical stability 1 | ASTM color (ASTM D1500) | | L4.0 | L4.0 | D8.0 | D8.0 |
| | Catalyst appearance | Cu | No gloss | No gloss | Blackening | Blackening |
| | | Fe | Blackening | Blackening | Blackening | Blackening |
| | | Al | No change | No change | Blackening | Blackening |
| Refrigerant compatibility 2 | | | Separated | Compatible | Separated | Compatible |
| Thermal/ chemical stability 2 | ASTM color (ASTM D1500) | | L0.5 | L0.5 | L0.5 | L0.5 |
| | Catalyst appearance | Cu | No gloss | No gloss | No change | No change |
| | | Fe | No gloss | No gloss | No change | No change |
| | | Al | No change | No change | No change | No change |

As clearly seen by the results in Tables 1-3, the refrigerating machine oils of Examples 1-9, when used with a fluoropropene refrigerant and/or a trifluoroiodomethane refrigerant, exhibited excellent refrigerant compatibility and thermal/chemical stability.

INDUSTRIAL APPLICABILITY

The present invention is useful as a refrigerating machine oil and a working fluid composition to be used in a refrigerating machine employing a fluoropropene refrigerant and/or a trifluoroiodomethane refrigerant.

The invention claimed is:

1. A working fluid composition for a refrigerating machine, consisting of:
a refrigerating machine oil consisting of a base oil and optionally an additive, wherein the base oil comprises an ester of a polyhydric alcohol and a fatty acid with a content of a C5-C9 branched fatty acid of 70-100% by mole, wherein the polyhydric alcohol is a mixture of pentaerythritol and di-(pentaerythritol); and
a refrigerant consisting of only one fluoropropene refrigerant.

2. A working fluid composition for a refrigerating machine according to claim 1, wherein the fluoropropene refrigerant is selected from the group consisting of 1,2,3,3-tetrafluoropropene, 1,3,3,3-tetrafluoropropene and 2,3,3,3-tetrafluoropropene.

3. A working fluid composition for a refrigerating machine according to claim 1, wherein
the fluoropropene refrigerant is selected from the group consisting of 1,2,3,3,3-pentafluoropropene, 1,3,3,3-tetrafluoropropene, 2,3,3,3-tetrafluoropropene, 1,2,3,3-tetrafluoropropene and 3,3,3-trifluoropropene.

4. A working fluid composition for a refrigerating machine according to claim 1, wherein the additive is present and is at least one selected from the group consisting of phosphoric acid esters, acidic phosphoric acid esters, thiophosphoric acid esters, acidic phosphoric acid ester amine salts, chlorinated phosphoric acid esters, phosphorous acid esters, phenylglycidyl ether-type epoxy compounds, alkylglycidyl ether-type epoxy compounds, glycidyl ester-type epoxy compounds, allyloxirane compounds, alkyloxirane compounds, alicyclic epoxy compounds, epoxidated fatty acid monoesters, epoxidated vegetable oils, phenol-based antioxidants, amine-based antioxidants, antiwear agents, extreme-pressure agents, oiliness agents, antifoaming agents, metal deactivators, viscosity index improvers, pour point depressants and detergent dispersants.

5. A working fluid composition for a refrigerating machine according to claim 1, wherein the moisture content of the refrigerating machine oil is not greater than 200 ppm based on a total amount of the refrigerating machine oil.

6. A working fluid composition for a refrigerating machine according to claim 1, wherein the content of the C5-C9 branched fatty acid is 90-100% by mole.

* * * * *